United States Patent [19]

Hoki et al.

[11] Patent Number: 4,652,590
[45] Date of Patent: Mar. 24, 1987

[54] BLENDED POLYETHYLENE-POLYSTYRENE COMPOSITIONS SUITABLE FOR PREPARATION OF CLOSED CELL FOAM PRODUCTS

[75] Inventors: Tsuneo Hoki; Nobuo Miura, both of Mie, Japan

[73] Assignee: The Dow Chemical Company, Midland, Mich.

[21] Appl. No.: 682,024

[22] Filed: Dec. 14, 1984

Related U.S. Application Data

[63] Continuation of Ser. No. 333,540, Dec. 22, 1981, abandoned.

[51] Int. Cl.$^4$ ............................................. C08J 9/00
[52] U.S. Cl. ........................................ 521/139; 521/59; 521/81; 521/98; 521/910; 264/53; 264/DIG. 5
[58] Field of Search .................................. 521/139, 59

[56] References Cited

U.S. PATENT DOCUMENTS

| | | | |
|---|---|---|---|
| 2,945,827 | 7/1960 | Henning | 521/139 |
| 3,224,934 | 12/1965 | Roper et al. | 521/139 |
| 3,398,105 | 8/1968 | Roper et al. | 521/139 |
| 3,657,163 | 4/1972 | Kishikawa et al. | 521/139 |
| 3,682,844 | 8/1972 | Schoegler | 521/139 |
| 3,743,611 | 7/1973 | Muroi et al. | 521/139 |
| 3,856,719 | 12/1974 | Miyamoto et al. | 521/139 |
| 3,969,472 | 7/1976 | Driscoll | 521/139 |
| 3,972,843 | 8/1976 | De Jong | 521/139 |
| 4,063,828 | 12/1977 | Mukai et al. | 521/139 |
| 4,153,762 | 5/1979 | Lauterberg et al. | 521/139 |
| 4,168,353 | 9/1979 | Kitamori | 521/139 |

*Primary Examiner*—Morton Foelak

[57] ABSTRACT

Ethylenic polymer/styrenic polymer blend foams are prepared from blends of (1) an ethylenic polymer resin having a density of from 0.915 to 0.930 g/cm$^3$ and a melt index of from 0.2 to 2.6 grams/10 minutes and (2) a styrenic polymer resin having a melt flow rate of from 1.4 to 18 grams/10 minutes. Foams having an excellent overall combination of properties are obtained (1) when the density, D, of such foams is in the range of from 10 to 40 kg/m$^3$ and the 25 percent compressive strength, F, in kg/cm$^2$ is from 0.013D$^{1.15}$ to 0.024D$^{1.15}$ and (2) when the ratio, R, of the melt flow rate of the styrenic polymer employed divided by the melt index of the ethylenic polymer employed is from 7 to 90 and the content, Y, of the styrenic polymer in said blend, in parts by weight based upon 100 parts by weight of the ethylenic polymer resin, satisfies the following requirement:

$$10 \leq Y \leq 3.94.7 + 1.18R - 294.1 \log(D).$$

5 Claims, 13 Drawing Figures

BLENDED POLYETHYLENE-POLYSTYRENE COMPOSITIONS SUITABLE FOR PREPARATION OF CLOSED CELL FOAM PRODUCTS

CROSS-REFERENCE TO RELATED APPLICATION

This is a continuation of application Ser. No. 333,540 filed Dec. 22, 1981, now abandoned.

BACKGROUND OF THE INVENTION

This invention relates to certain polyethylene-polystyrene blend compositions and to the preparation of closed cell foam products therefrom. In a more particular aspect, this invention relates to a novel foam product having heretofore unattainable structural indices and properties.

Heretofore, polystyrene resins and polyethylene resins have individually been used in the form of molded foams, which have applications such as heat insulation materials, shock absorbing materials, floating materials, etc.

However, such applications have thus far been limited to those of specific conditions conforming to the properties peculiar to the individual foam products concerned. More specifically, polystyrene resin foams are deficient in solvent resistance, flexibility, compressive recovery, and capacity in absorbing repeated impacts and are thus not generally suitable as shock absorbing cushioning materials. On the other hand, polyethylene resin foams are deficient in stiffness, thermal resistance, and creep resistance and are therefore not generally suitable for applications requiring such properties.

Efforts have heretofore been made to blend the two resins and develop a unique foam combining the advantageous properties of the two resins. For example, the most advanced ideas are found in Japanese Patent Publication No. 34,662/1977 dislcosing a method of mixing the two resins in the presence of a specific mixed medium and Japanese Patent Laying-Open No. 35,471/1974 describing a method of polymerizing styrene as contained in polyethylene resin; both of these methods being ultimately directed toward foaming the combined resins.

These and other conventional techniques, however, are not believed to have reached suitable levels of completion.

This is because of the fact that, even though the foams obtained according to these conventional methods, as compared with the foams of polystyrene, are improved in enhancement of flexibility, they are nonetheless not at all improved in repeated elastic recovery or in repeated cushioning coefficient (average maximum acceleration: G value in JIS Z No. 0235, 6.5.1.). Furthermore, the foams resulting from the aforementioned conventional blend approaches, as compared with the foams of polyethylene resin, exhibit undesirable properties such as increased stiffness and degraded solvent resistance or lowered repeated cushioning coefficient (G value). These conventional polystyrene-polyethylene foams are low in closed cell ratio, so their heat insulation properties are inferior. When the foams are subjected to fabrication by cutting and severing, there frequently ensues heavy occurrence of burrs on cut and severed surfaces, i.e., a phenomenon which symbolizes the difficulty in the homogenization of the two resins. This phenomenon tends to gain in prominence in proportion as the expansion ratio of the blends is increased.

In recent years, the demand has been increasing in the market for cushioning materials suiting the packaging of light-weight commodities such as audio instruments, compact computers, and high-grade cameras, all of which abhor repeated shocks and vibrations while in transportation as well as for flexible materials having both noise insulation property and heat insulation property.

Properties desirable for cushioning materials include flexibility enough to absorb small vibrations, stiffness enough to resist buckling or creeping on exposure to relatively large shocks and loads, combination of flexibility and stiffness in economical thickness, and stability to retain these properties at such a temperature of about 70° C. encountered in the holds of ships, for example. Properties desirable for heat insulation materials include flexiblity enough to be bent and compressed so as to be packed in walls, heat insulation property high enough to enhance the inhabitability in economical thickness, flexibility and heat insulation retaining property, flexibility enough to absorb vibrations generated on the floors, in cases where the heat insulation materials are used in floating floors, stiffness enough to withstand the loads applied, dimensional stability in temperatures exceeding about 70° C., low water vapor permeability and outstanding heat insulation.

These requirements (i.e., the provision of the above-stated combination of properties) are not satisfied by conventional polyethylene or polystyrene foamed products nor by the foam products provided by the conventional polyethylene-polystyrene blend techniques. Consequently, it has been costly to manufacture individual materials meeting the specific requirements of various end-use applications.

The primary object of this invention, therefore, is to provide a novel foam which exhibits a well balanced combination of flexibility and compression strength, excellence in compression recovery, resistance to distortion due to repeating compression, resistance to creep, heat insulation property, durability or good retention of heat insulation property as a function of time, and suitability for fabrication by cutting and severing, and dimensional stability against heat and solvents.

SUMMARY OF THE INVENTION AND DETAILED DESCRIPTION THEREOF

The present invention will be hereinafter described in detail with reference to the accompanying drawings and photographs. First, the cell walls of the foams of this invention are formed of a blend of an ethylenic polymer resin with a melt index (MI) in the range of from 0.2 to 2.6 g/10 minutes and a styrenic polymer resin with a melt flow index (MFI) in the range of from 1.4 to 18 g/10 minutes. The term "ethylenic polymer resin" as used herein means an ethylenic polymer resin having a density in the range of from 0.915 to 0.930 g/cm$^3$ as measured by ASTM D 1505 (method employing a density gradient tube). This product is desirably a homopolymer of ethylene (e.g. low density polyethylene), but it may alternatively be a copolymer of ethylene and a monomer capable of copolymerizing with ethylene such as, for example, acrylate esters (e.g. ethyl acrylate, etc.), methacrylate esters (e.g. methyl methacrylate, etc.), propylene, isobutylene, or butene-1 in an amount of 20% by weight or less. As the styrenic polymer resin, it is preferable to employ a homopolymer of styrene. However, it is alternatively possible to employ a copolymer of styrene and a monomer capable of copolymerizing the styrene such as, for example, acrylonitrile or butadiene in an amount of 30% by weight or less.

The terms "MI" and "MFI" as used herein mean the flow properties of the respective resins which are defined in ASTM D 1238. The reason for the strict selection of the values of these flow properties within the stated ranges is that when the resins have flow properties either falling short of their lower limits or exceeding their upper limits, the blend of the resins fails to produce a foam having the resins homogeneously blended therein. That is, when resins having melt flow properties outside the stated ranges are employed, the resulting foam fails to exhibit the satisfactory combination of closed cell ratio, surface uniformity, and appearance as defined and required by the present invention.

Even when each resin has flow properties falling within the above-mentioned ranges, it is essential that the flow rate ratio (R) should fall within the range indicated below:

$$7 \leq R \leq 90$$

wherein, R denotes a flow rate ratio of $$\frac{MFI \text{ of polystyrene resin}}{MI \text{ of polyethylene resin}}.$$

The reason for this particular range of the ratio (R) is that when the blend of the two resins has its flow rate ratio outside the range mentioned above, the foam made of this blend fails to acquire the requisite combination of closed cell ratio, surface uniformity, and appearance sought to be achieved according to the present invention.

Further in the present invention, even when the blend of the two resins satisfies the aforementioned flow properties for the individual resins and possesses a flow rate ratio between them which falls within the specified range for (R), it is still required to have a quantitative ratio (Y) of the styrenic polymer resin to the ethylenic polymer resin falling within a range specified.

The quantitative ratio (Y) used herein is expressed as the quantity (in parts by weight) of the styrenic polymer resin (PS) employed in polymer blends of the present invention based on 100 parts by weight of the ethylenic polymer resin (PE) employed in such polymer blends.

FIGS. 1–3 are analytical graphs showing the relationship between the quantitative PS-PE ratio (Y) and foam density (D) in kilograms/cubic meter. FIG. 1 represents the case wherein the flow rate ratio (R) is 90. FIG. 2 represents the case wherein the ratio (R) is 28.8 and FIG. 3 illustrates the case wherein the ratio (R) is 7.

FIGS. 1–3 also illustrate data points obtained for various foams wherein the polyethylene and polystyrene resins employed satisfied both the flow properties and the flow rate ratio (R) defined by this invention. In FIGS. 1–3 the data points for the various foams are divided into two groups, i.e., one group for foams possessing closed cell ratio, surface uniformity, and appearance which are all above satisfactory levels (designated by the mark O or ⊙) and the other group of foams not possessing such properties above satisfactory levels (designated by the mark ×). The lines A, B and C, respectively, in FIGS. 1–3 represent the dividing line (i.e., in terms of Y as a function of log D) between foams satisfying the requirements of the present invention and foams which do not satisfy such requirements.

Based upon the data presented in FIGS. 1, 2 and 3, it can be seen that the foams of this invention (i.e., those ranked with the mark O or ⊙ in FIGS. 1, 2 and 3) can have a quantitative PS-PE ratio (Y) which greatly varies with the PS-PE flow rate ratio (R) but which has a ceiling and a bottom, which are expressed by the following formula:

$$10 \leq Y \leq 394.7 + 1.18R - 294.1 \log(D)$$

wherein D denotes foam density in kilograms/cubic meter.

The foam of the present invention, which is formed of resin blends simultaneously satisfying the aforementioned flow properties for each of the individual resins, flow rate ratio (R), and quantitative PS-PE ratio (Y), is further required to be such that the relationship between foam density (D) and stress (F) necessary for producing 25% compression of the foam should fall within a fixed range. FIG. 4 shows such relationship between foam density (D) and 25% compressive strength (F) with regard to the foam specimens ranked with the mark O or ⊙ in FIGS. 1, 2 and 3, indicating the homogeneous mixture of the two resins. The foam specimens were evaluated as to whether they have creep resistance and cushioning property at the same time. In FIG. 4, the foam specimens having these two properties concurrently are ranked with the mark ⊙, the specimens having the two concurrently at a lower level are rated with the mark O and the specimens not having the two properties at the same time are ranked with mark ×. It can be seen from FIG. 4 that the foams of this invention meet, in this relationship, the requirements expressed by the formula:

$$0.024 D^{1.15} \geq F \geq 0.013 D^{1.15}$$

wherein D ranges from 10 to 40 and preferably D is from 15 to 30.

FIGS. 5 through 8 are microscopic photographs (magnified 3,000 times actual size) showing the cell walls of the foam of run No. 61 ranked by the mark ⊙ and those of run No. 13 ranked by the mark × respectively in FIG. 4. FIGS. 5 and 7 show the surface conditions of the cell walls, whereas FIGS. 6 and 8 show the cell walls from which polystyrene component was dissolved off. It can be seen from FIGS. 5 and 6 that the cell walls of this invention (run No. 61) have a structure comprising polystyrene in the form of relatively simple lines and a polyethylene matrix wherein the lines are dispersed relatively in parallel, while as can be seen from FIGS. 7 and 8, the cell walls of the comparative example (run No. 13) have the other structure wherein polystyrene component is dispersed in the form of zig-zag lines in a polyethylene matrix.

FIG. 9 is a graph showing, via the solid line plot, the relation between the compressive stress and the compressive strain for the foam of FIGS. 5 and 6 (Test No. 61). For the purpose of comparison, FIG. 9 also shows the relation between compressive stress and compressive strain for a polystyrene resin foam (indicated by a one-dot chain line) and for a polyethylene resin foam (indicated by a dotted line) which were expanded to almost the same degree or density.

From FIG. 9, it is clear that the blend foam of the present invention which exhibits the aforementioned structure possesses far greater softness and higher recovery than the foam of polystyrene resin. In addition, it is also clear from FIG. 9 that, in the range of low compressive stress, such blend foam of the present invention exhibits greater softness than the foam of polyethylene resin and, in the range of increased compressive stress, comes to retain a compressive deformation similar to the foam of polyethylene resin.

FIG. 10 and FIG. 11 are graphs respectively showing the relation between closed cell ratio and water vapor permeability and the relationship between the surface uniformity (peeling-off ratio (% of area)) and the fabricability by routering and sawing with regard to the foams of the sort involved in the present invention. In FIG. 10, the higher water vapor permeability values are not desirable for the purposes of the present invention. In FIG. 11, the higher numerical ratings for routering and sawing fabricability evidence better fabricability performance and are thus desirable for the purposes of the present invention. As can be seen from FIG. 10 and FIG. 11, the foams of such a dispersion state so as to have a closed cell ratio lower than 90% or having a peeling-off ratio exceed the level of 5% (with the surface uniformity rates not surpassing the mark Δ) either exhibit higher water vapor permeability than acceptable (and thus not having durable heat insulation property) or suffer from heavy occurrence of burrs on the cut or severed surfaced of the foam. Such foams are low in commercial value.

FIG. 12 and FIG. 13 are graphs respectively showing the relation between creep and package stack crumbling tendency and relationship between the degradation of the repeated cushioning property and damage of articles packaged. In FIG. 12, the higher numerical ratings for package stack crumbling tendency are more desirable for packaging or cushioning applications. In FIG. 13, the lower numerical ratings for damage to package articles are desired for packaging or cushioning applications. As can be seen from FIGS. 12 and 13, foams in which the creep values exceed 6% and the degradation values of the repeated cushioning property exceed 40% are low in commercial value as cushioning materials.

The foregoing results or parameters represent the practical scales or objectives to be met in the various evaluations involved in the present invention.

As described hereinbefore, the flow properties for the individual resin components, the flow rate ratio (R), and the quantitative PS-PE ratio (Y) govern the proper selection of appropriate polymer composition feedstock for the foams of the present invention. Beyond that, however, the relation between the density (D) and compressive stress (F) is also important in attaining the cell structure properties including the shape and size of cells, thickness of the cell walls, the distribution of the cells as well as resin dispersion in the foam structure. All these factors cooperate to govern the foam's shock absorbing property and mechanical properties. Thus, the properties of the raw materials, the density (D), and the compressive stress (F) may well be regarded as indices for the internal structure of the foams.

In this connection, it should be noted that when the flow rate ratio (R) is relatively low (i.e., toward the lower end of the above-stated 7 to 90 range), then one should employ relatively lower quantitative PS-PE ratios (Y) and relatively lower foam densities (D) than what one might otherwise employ (i.e., in the case of relatively higher R value blend compositions).

Table 7 shows the results of evaluating the foams of this invention and comparative foams such as commercial polystyrene-polyethylene blend foams, polystyrene foams and polyethylene foams. As can be seen from the table, the foams of this invention were superior to any commercial polystyrene-polyethylene blend foams in their overall combination of desirable properties (i.e., creep resistance, loss of cushioning effectiveness due to repeated impact, compression recovery, solvent resistance and dimensional stability at elevated temperatures). Particularly beneficial features of the foams of this invention include their capability of exhibiting 90 percent or more of compression recovery and solvent resistance on the order of 10 volume percent or less dissolution pursuant the hereinafter described solvent resistance test.

An exemplary method suitable for use in the production of the ethylenic polymer/styrenic polymer blend foam of this invention will be described below.

As has been hereinbefore indicated, the most important of all the factors to be considered in the production of the foam of this invention resides in the selection of the proper blend of styrenic and ethylenic polymer resins. To be specific, (1) an ethylenic polymer resin with an MI in the range of from 0.2 to 2.5 g/10 minutes and styrenic polymer resin with an MFI in the range of from 1.4 to 18 g/10 minutes are combined in respective amounts such as to fulfil the requirements:

(2) that the flow rate ratio (R) fall in the range of from 7 to 90 and (3) that the quantitative PS-PE ratio (Y) exceed at least 10.

Then, the resultant blend is expanded by the use of a volatile organic blowing agent to produce a foam having the aforementioned density (D). The upper limit of the aforementioned quantitative PS-PE ratio (Y) is fixed as follows.

$$Y \leq 394.7 + 1.18R - 294.1 \log(D)$$

This is required to obtain the desired foams of the present invention, namely those having high closed cell ratio, surface uniformity and good appearance from the homogeneous dispersion of the two resins.

In carrying out the above-noted process for foaming the styrenic polymer-ethylenic polymer blend of the present invention, said blend is mixed with a volatile organic blowing agent under elevated pressure at an elevated temperature to obtain a molten mixture, which is cooled to a temperature suitable for foaming and which is then extrusion foamed out into the atmosphere. In this process, it is possible to use either a blend prepared by mixing the two pelletized or powdered resins homogeneously in a dry solid state with a blender or a blend obtained by kneading such a pelletized or powdered resin mixture in a molten state with an extruder.

The selection of the volatile organic blowing agent to be used is important for the production of the foam of this invention. The blowing agent is desired to have a kauri-Butanol (KB) value as determined by ASTM D-1133 within the range of from 15 to 22. A typical example of the blowing agent advantageously used for manufacturing the foams of this invention is dichlorodifluoromethane (KB value 18). Blowing agents having KB values smaller or larger than the stated range such as, for example, dichlorotetrafluoroethane (KB value 12), monochlorodifluoromethane (KB value 25), and trichloromonofluoromethane (KB value 60) all fail to accomplish the objects of this invention because they seriously impair the dispersibility in the resin blends of the present invention or heavily degrade the physical properties of the foam to be produced.

The amount of the blowing agent to be used for producing the foam of this invention generally falls in the range of from 15 to 35 parts by weight based on 100 parts by weight of the resin blend employed herein. Within this range, the amount may be freely selected to achieve the foam density desired.

The blend of this invention may contain heat and light stabilizers, lubricants, and colorants. For the adjustment of the size and distribution of individual cells, the blend of this invention may further contain particulate additives such as, for example, inorganic carbonates, silicates, phosphates, metal salts of higher fatty acids, etc. as nucleating agents. In addition, chemical (i.e., thermally decomposable) blowing agents may be employed in conjunction with the above-described volatile organic blowing agents.

BRIEF EXPLANATION OF THE DRAWINGS

FIGS. 5 and 7 show cell walls without solvent treatment and FIGS. 6 and 8 show cell walls from which polystyrene was removed by washing with a solvent.

Figure 1:
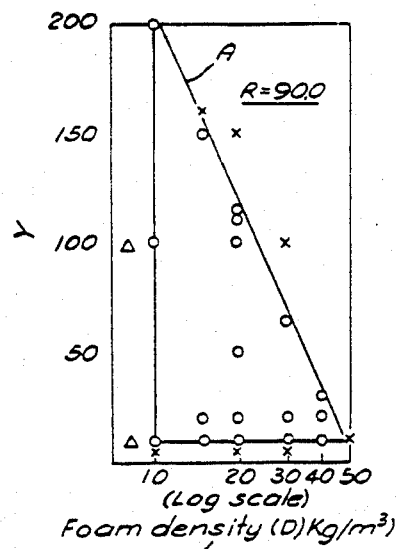
FIGS. 1-3 show the relationship between foam density (D) and ratio (Y) of polystyrene to polyethylene for each of the three different flow rate ratios (R). As can be seen from FIGS. 1-3, the upper limit of the ratio Y in each figure is linearly related to the log of the foam density, D.

The present invention is further illustrated and exemplified by reference to the following Examples and Comparative Examples. In such Examples and Comparative Examples the following testing and evaluation methods are employed.

1. Melt Index (MI) of the Ethylenic Polymer Resins
   It was determined in accordance with ASTM D 1238 employing Test Conditions of D (190° C.; 2,160 grams).
2. Melt Flow Rate (MFI) of Styrenic Polymer Resins
   It was determined in accordance with ASTM D 1238 employing Test Conditions of G (200° C.; 5,000 grams).
3. Foam Density
   It was measured in accordance with JIS K 6767.
4. Compressive Strength
   It was measured in accordance with JIS K 6767.
5. Creep
   It was determined in accordance with JIS K 6767 under the conditions of 0.1 kg/m$^2$ load and 24 hour standing.
6. Repeated Cushioning Property
   It was determined in accordance with JIS Z0235 (Related ASTM Designation: D 1596). Each specimen 50 mm thick was impacted with a series of 5 drops from the height of 60 cm. A maximum acceleration-static stress curve was obtained respectively with regard to the first drop and the second through fifth drops and the maximum acceleration values were found out at optimum stress. Decrease ratio was calculated according to the following formula.

$$\text{Decrease ratio} = \frac{\text{Maximum Acceleration of Average 2-5 Drops} - \text{Maximum Acceleration of First Drop}}{\text{Maximum Acceleration of First Drop}} \times 100$$

7. Compression Recovery Ratio
   Foam specimens were compressed 80 percent at a rate of 10 mm/minute by the use of a testing machine specified in JIS K 6767 and released at room temperature. The thickness of each specimen was measured 30 minutes after release of the applied compressive force.
8. Solvent Resistance
   It was determined according to ASTM D 543. Foam specimens were dipped in toluene at 23° C. for 7 days and then the change of their volumes was measured.
9. Closed Cell Ratio
   Determination was made in accordance with ASTM D-2856 by the use of an air pycnometer.
10. Surface Uniformity
    A self-adhesive cellophane tape 20 mm wide and 120 mm long was applied on the skin of each foam specimen with a load of 0.5 kg/cm$^2$, leaving 20 mm end of the tape not applied in length for peeling-off. The tape was peeled off from the skin 30 minutes after application at a speed of 100 mm/minute at an angle of 180 degrees. Evaluation was made by the area of the skin peeled off with the tape as compared with the area of the tape applied on the skin. The evaluation results are expressed as follows.

| Peeling-Off Ratio | Symbol |
| --- | --- |
| 0% | |
| 5% or less | O |
| Over 5% to 20% | Δ |

-continued

| Peeling-Off Ratio | Symbol |
|---|---|
| Over 20% | x |

11. External Appearance

The smoothness and conditions of skin were evaluated by visual observation. Results were ranked as follows.

| Symbol | Ranking Description |
|---|---|
| ⊙ | Smooth, without fluffy and cloudy appearance |
| O | Smooth, not fluffy but partially cloudy |
| Δ | Smooth, but fluffy and cloudy |
| x | Rough, remarkably fluffy and totally cloudy |

Foams ranked ⊙ are required for cushioning applications while Rank O or higher is necessary for heat insulation.

12. Water Vapor Permeability

It was determined in accordance with ASTM C 355 under the conditions which are as follows.

| Thickness of specimens: | 25 millimeters |
|---|---|
| Temperature: | 30 degrees C |
| Relative humidity: | 50 percent |

13. Routering and Sawing Fabricability (A) Routering

Foam specimens 50 mm thick were hollowed out at 4,000 rpm with a woodworking router. Visual evaluation was made by observing whether the specimens were routered well without production of fine splits, burrs and/or skin turn-ups.

(B) Sawing

Foam specimens 50 mm thick were severed at a speed of 1,000 m/minute with a band saw having a scallop edge. Evaluation was made through observing the sections produced by severing, that is, visually examining if the specimens were well severed without production of burrs and/or skin turn-ups. Evaluation results are expressed as follows.

| Ranking Description | Ranking |
|---|---|
| Free from burrs and skin turn-ups | 5 |
| Some burrs but no skin turn-up | 4 |
| Conspicuous burrs and no skin turn-up | 3 |
| Many burrs and no skin turn-up | 2 |
| Many burrs and many skin turn-ups | 1 |

In practical applications, foams ranked 4 or higher are required as cushioning materials, whereas foams ranked 3 or higher are needed as heat insulation materials.

14. Package Stacking in Storage

The relationship between package defomation and package stack crumbling tendency and creep of cushioning materials was examined. Audio amplifiers were packed in cases designed for obtaining optimum shock-absorbing conditions by the use of cushioning materials. The packages containing the amplifiers were stacked at the height of ten packages for six months. Evaluation was made with regard to the creep of the cushioning materials used in the packages in the lowest layer. Stack crumbling tendency and the damage of the packages in the lowest layer owing to package deformation were also evaluated.

| Ranking | Ranking Description | |
|---|---|---|
| | Creep | Package Deformation and Crumbling |
| 4 | 5% or less | No package deformation and no package stack crumbling |
| 3 | Over 5% to 10% | No package deformation and no package stack crumbling |
| 2 | Over 10% to 15% | Slight package deformation but no package stack crumbling |
| 1 | Over 15% | Packages were deformed and package stack was crumbled in some cases. |

15. Damage of Articles Packaged in Transportation

Cocktail glasses were loaded on a truck, ten in each carton, five cartons high, transported 100 km and unloaded. This procedure was repeated three times and then the number of broken cocktail glasses was counted.

16. Dimensional Stability at Elevated Temperature

Used were foam specimens 10 mm thick, 50 mm wide and 200 mm long, which were measured accurately. The specimens were placed in an air-circulation type heat chamber at 80° C. for 24 hours. The specimens were measured again 30 minutes after being taken out from the chamber. Evaluation was made by calculating out the average difference between the dimensions of the specimens before and after being heated.

17. Resins Used in Examples and Comparative Examples

The following tables show the resins used in examples and comparative examples.

| | MI (g/10 min.) | Density (g/cc) | Polyethylene Note |
|---|---|---|---|
| A | 0.2 | 0.9215 | Trial product, made by Asahi-Dow Limited |
| B | 0.26 | 0.9215 | Trial product, made by Asahi-Dow Limited |
| C | 0.3 | 0.9200 | Yukalon HE-30, made by Mitsubishi Petrochemical Co., Ltd. |
| D | 0.4 | 0.918 | Polyethylene M-1804, mage by Asahi-Dow Limited |
| E | 0.5 | 0.9210 | Yukalon HE-60, made by Mitsubishi Petrochemical Co., Ltd. |
| F | 0.66 | 0.9210 | Trial product, made by Asahi-Dow Limited |
| G | 1.1 | 0.9240 | Blend of Yukalon ZF-52 and NF-40, made by Mitsubishi Petrochemical Co., Ltd. |
| H | 2.6 | 0.9220 | Polyethylene F-2225, made by Asahi-Dow Limited |
| I | 0.15 | 0.9215 | Trial product, made by Asahi-Dow Limited |
| J | 3.0 | 0.9210 | Polyethylene F-2130, made by Asahi-Dow Limited |

| | MFI (g/10 min.) | Polystyrene Note |
|---|---|---|
| A | 1.4 | Trial product, made by Asahi-Dow Limited |
| B | 2.1 | Styron GP-686, made by Asahi-Dow Limited |
| C | 5.4 | Blend of Styron GP-666, GP-679, made by Asahi-Dow Limited |
| D | 7.5 | Styron GP-666, made by Asahi-Dow Limited |
| E | 18 | Styron GP-679, made by Asahi-Dow Limited |
| F | 0.9 | Trial product, made by Asahi-Dow Limited |
| G | 1.25 | Trial product, made by Asahi-Dow Limited |
| H | 20 | Trial product, made by Asahi-Dow Limited |

EXAMPLE 1 AND COMPARATIVE EXAMPLE 1

To an extruder having an inside diameter of 65 mm, 100 parts by weight of low-density polyethylene A and 20 parts by weight of polystyrene E were fed, melted and kneaded. Into the blend, 30 parts by weight, based on 100 parts by weight of the resultant blend, of dichlordifluoromethane (hereinafter abbreviated as F-12) was injected. After the blend and the injected blowing agent had been melted and blended, the resultant blend was cooled to 115° C. in a cooling device and then extrusion-expanded through a circular die orifice 8 mm in diameter in the atmosphere. The produced foam was in the shape of a cylinder about 60 mm in diameter. It was a homogeneous foam having 20 kg/m$^3$ of density and 1.5 mm of average cell size. This is indicated as Run No. 1.

Various foams having about 20 kg/cm$^2$ of density and about 1.5 mm of average cell size were obtained by following the procedure described above except for changing the used resins to polystyrene resins A, B, C, D, F, G and H and polyethylene resins B, C, D, F, G, H, I and J, with the flow rate (R) selected as indicated in Table 1. These foams were serially assigned Run Nos. 2-13. These foams together with the foam of Run No. 1 were tested for closed cell ratio, surface uniformity, and appearance by the respective methods indicated hereinbefore. The results were as shown in Table 1.

It is noted from Table 1 that in order to satisfy the tests of closed cell ratio, surface uniformity, and appearance, (i.e., in order to achieve a sufficiently homogeneous blended state), the respective blends of the foams should be composed of polyethylene resin having an MI in the range of from 0.2 to 2.6 g/10 min. and a polystyrene resin having an MFI in the range of from 1.4 to 18 g/10 min. at a flow rate ratio (R) falling within the range of from 7 to 90. The foams of Run Nos. 1, 2, 5, 7, 11, and 12 were tested for water vapor permeability by the method set forth hereinbefore. Then, the relationship between the water vapor permeability and respective closed cell ratios for the individual foams was plotted. The results, showing water vapor permeability as a function of closed cell ratio are presented in FIG. 10.

Figure 10:
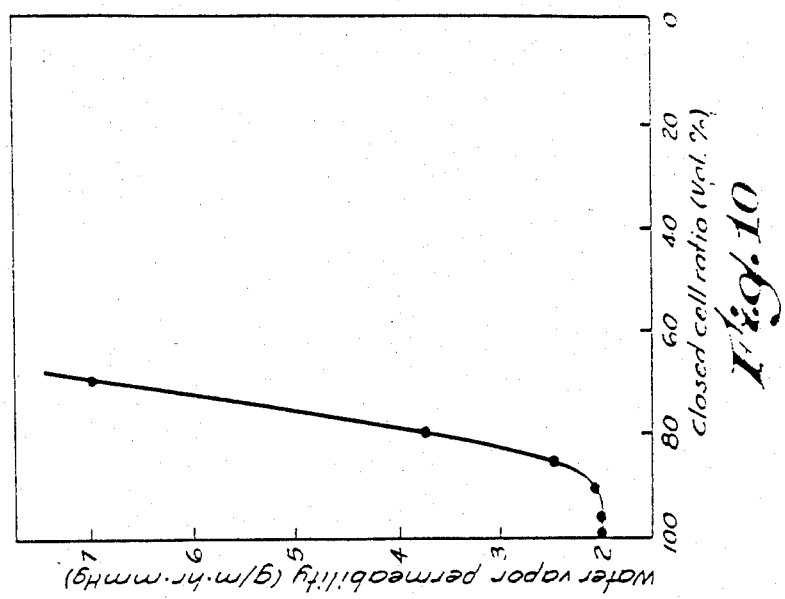
FIG. 10 is a graph showing the relationship between water vapor permeability and closed cell ratio. As can be seen, water vapor permeability dramatically increases as the closed cell ratio is decreased below 90 volume percent.

From FIG. 10, it is noted that in order to achieve a desirably low water vapor permeability (e.g., as would be desired for heat insulation purposes), the foam should possess a closed cell ratio of 90% or more.

In addition to the foregoing, the foams of Run Nos. 1, 5, 6, 7, 8, 9, and 12 were tested for fabricability by routering and sawing and for peeling-off ratio by the methods set forth hereinbefore. By plotting the results of peeling-off ratio and surface uniformity along one and the same horizontal axis against the results of routering and severing fabricability, there was obtained the graph of FIG. 11.

Figure 11:
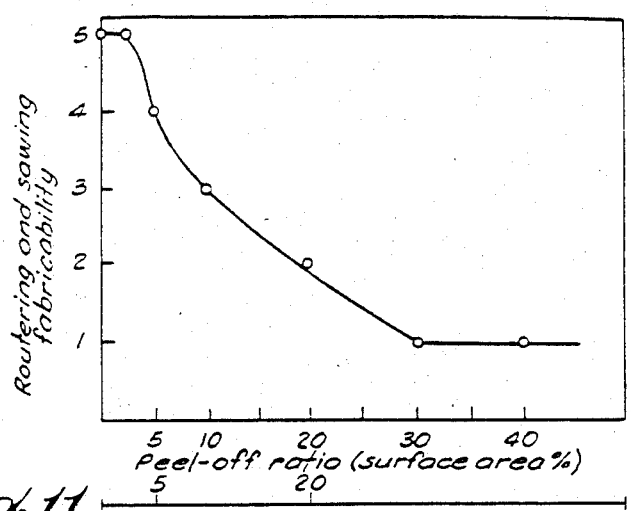
FIG. 11 is a graph showing the relation between routering and sawing fabricability and peeling-off ratio (i.e., surface uniformity). As can be seen, suitability for routering and sawing fabrication methods and surface uniformity dramatically decrease as peel-off ratio is increased beyond 3 to 5 surface area percent.
Figure 12:
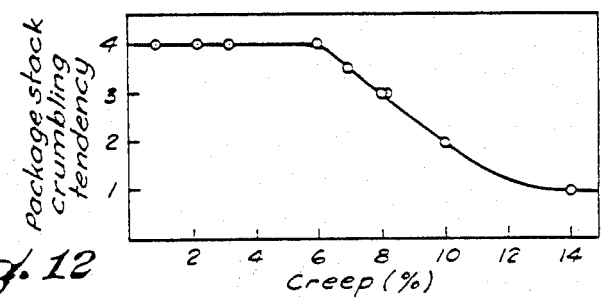
FIG. 12 is a graph showing the relation between package stack crumbling tendency and creep. As can be seen, the tendency for package stack crumbling worsens at creep values above 6 percent.
Figure 13:
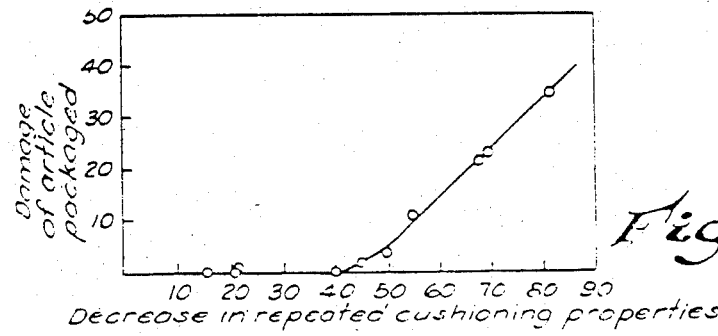
FIG. 13 is a graph showing the relation between damage of articles packaged and decrease in repeated cushioning property with regard to the transportation of the articles. As can be seen, the propensity for damage to occur to a packaged article is notably increased when the "decrease in repeated cushioning property" parameter exceeds 40 percent.

FIG. 11 indicates that in order for the foam to enjoy good fabricability, the peeling-off ratio should be less than 5 (area) % (corresponding to the mark of O or ⊙ in terms of surface uniformity).

TABLE 1

| Run No. | MI of Polyethylene | MFI of Polystyrene | $R = \frac{MFI}{MI}$ | Closed Cell Ratio (%) | Surface Uniformity | Appearance |
|---|---|---|---|---|---|---|
| Example 1 | | | | | | |
| 1 | 0.2 | 18 | 90 | 96 | | |
| 2 | 0.26 | 7.5 | 28.8 | 98 | | |
| 3 | 0.66 | 18 | 27.3 | 96 | | |
| 4 | 0.2 | 5.4 | 27 | 98 | | |
| 5 | 2.6 | 18 | 7.2 | 90 | O | |
| 6 | 0.2 | 1.4 | 7.0 | 91 | O | |
| Comparative Example 1 | | | | | | |
| 7* | 1.1 | 7.5 | 6.8 | 85 | Δ | Δ |
| 8* | 0.4 | 2.1 | 5.25 | 60 | x | Δ |
| 9* | 0.2 | 20 | 100 | 90 | Δ | Δ |
| 10* | 0.15 | 18 | 120 | 75 | Δ | x |
| 11* | 0.2 | 1.25 | 6.25 | 70 | Δ | x |
| 12* | 0.3 | 0.9 | 3 | 80 | x | x |
| 13* | 3.0 | 18 | 6.0 | 60 | x | x |

*Not examples of the present invention.

EXAMPLE 2 AND COMPARATIVE EXAMPLE 2

Foams were obtained by following the procedure of Example 1, except that polystyrenes, A, B, D, E, and H and polyethylene A, B, and D were combined in amounts calculated to give component proportions (Y) of 20, 50, 40, and 100 and target foam density (D) was fixed at 10, 20, and 40 kg/m$^3$. The produced foams were serially assigned Run Nos. 14-29.

The obtained foams were tested for closed cell ratio, surface uniformity, and appearance by the respective methods set forth hereinbefore. The results are shown together with the components in Table 2.

TABLE 2

| Run No. | MI of Polyethylene | MFI of Polystyrene | R Value | Ratio (Y) of Polystyrene (wt. parts)[1] | Foam Density[2] | Ratio (%) | Surface Uniformity | Appearance |
|---|---|---|---|---|---|---|---|---|
| Example 2 | | | | | | | | |
| 14 | 0.2 | 1.4 | 7.0 | 20 | 10 | 97 | | O |
| 15 | 0.2 | 18 | 90 | 20 | 10 | 95 | | |
| 16 | 0.2 | 18 | 90 | 20 | 40 | 90 | O | O |
| 17 | 0.2 | 18 | 90 | 100 | 20 | 94 | | |
| 18 | 0.2 | 18 | 90 | 100 | 10 | 93 | | O |
| 19 | 0.26 | 7.5 | 28.8 | 20 | 10 | 97 | | O |
| 20 | 0.26 | 7.5 | 28.8 | 40 | 20 | 96 | | |
| 21 | 0.26 | 7.5 | 28.8 | 100 | 10 | 94 | | O |

TABLE 2-continued

| Run No. | MI of Polyethylene | MFI of Polystyrene | R Value | Ratio (Y) of Polystyrene (wt. parts)[1] | Foam Density[2] | Ratio (%) | Surface Uniformity | Appearance |
|---|---|---|---|---|---|---|---|---|
| Comparative Example 2 | | | | | | | | |
| 22* | 0.4 | 2.1 | 5.25 | 20 | 10 | 40 | x | x |
| 23* | 0.4 | 2.1 | 5.25 | 20 | 40 | 55 | x | x |
| 24* | 0.2 | 20 | 100 | 20 | 10 | 45 | x | x |
| 25* | 0.2 | 20 | 100 | 20 | 40 | 60 | x | x |
| 26* | 0.4 | 2.1 | 5.25 | 50 | 10 | 30 | x | x |
| 27* | 0.4 | 2.1 | 5.25 | 50 | 40 | 40 | x | x |
| 28* | 0.2 | 20 | 100 | 50 | 10 | 30 | x | x |
| 29* | 0.2 | 20 | 100 | 50 | 40 | 50 | x | x |

*Not an example of the present invention.
[1] Per 100 parts by weight of polyethylene.
[2] D, in kg/meter$^3$ It is seen from Table 2 that even when the melt indexes and melt flow rates of the individual resin components fall within the claimed range and when the component proportion (Y) of the blend of two resins and the foam density (D) fall within the claimed range, the foam fails to acquire good quality unless the flow rate ratio (R) satisfies the relation of $7 \leq R \leq 90$.

EXAMPLE 3 AND COMPARATIVE EXAMPLE 3

A resin blend obtained by uniformly blending 100 parts by weight of low-density polyethylene A, 10 parts by weight of polystyrene E and 0.05 part by weight of talc in a tumbler was melted and kneaded in an extruder having an inside diameter of 65 mm. Dichlorodifluoromethane (F-12) was injected into the extruder and admixed therein with the resin blend. The resultant blend was cooled to 115° C. by being passed through a cooling device. The cooled blend was extrusion foamed through a die orifice 8 mm in diameter into the atmosphere. Consequently, there was obtained a foam having 10 kg/m$^3$ of density and about 1.3 mm of average cell size (Run No. 30).

Secondly, foams having 15, 20, 30, and 40 kg/m$^3$ of density were obtained by following the procedure described above, except that the amount of the blowing agent varied (Run Nos. 31-34). Other foams were obtained by using 5, 20, 30, 50, 65, 100, 110, 115, 150, and 160 parts by weight of polystyrene per 100 parts by weight of polyethylene and adjusting the extrusion foaming so as to give 8, 10, 15, 20, 30, 40, and 50 kg/m$^3$ of foam density (Run Nos. 35-56).

The foams thus obtained were tested for closed cell ratio, surface uniformity, appearance, 25% compression strength, and creep. The results are shown in Table 3.

The results of the tests for appearance, surface uniformity, and closed cell ratio given in Table 3 were obtained in the same manners as shown in Example 1 and overall rating is expressed as follows.

| Overall Rating | Closed Cell Ratio | Surface Uniformity | Appearance |
|---|---|---|---|
| O | 90% or higher | ~O | ~O |
| Δ | Over 90% to 85% | O | Δ |
| x | Not satisfying the conditions given above | | |

TABLE 3

| Run No. | MI of Polyethylene | MFI of Polystyrene | R Value | Ratio (Y) of Polystyrene (wt. parts)[1] | Foam Density (D)[2] | 25% Compressive Strength (kg/cm$^2$) | Creep (%) | Appearance Surface Uniformity and Closed Cell Ratio |
|---|---|---|---|---|---|---|---|---|
| Example 3 | | | | | | | | |
| 30 | 0.2 | 18 | 90 | 10 | 10 | 0.19 | 8.0 | O |
| 31 | 0.2 | 18 | 90 | 10 | 15 | 0.29 | 6.0 | O |
| 32 | 0.2 | 18 | 90 | 10 | 20 | 0.41 | 3.5 | O |
| 33 | 0.2 | 18 | 90 | 10 | 30 | 0.65 | 2.2 | O |
| 34 | 0.2 | 18 | 90 | 10 | 40 | 0.91 | 1.3 | O |
| 35 | 0.2 | 18 | 90 | 20 | 15 | 0.34 | 5.0 | O |
| 36 | 0.2 | 18 | 90 | 20 | 20 | 0.48 | 3.1 | O |
| 37 | 0.2 | 18 | 90 | 20 | 30 | 0.76 | 1.5 | O |
| 38 | 0.2 | 18 | 90 | 20 | 40 | 1.08 | 1.0 | O |
| 39 | 0.2 | 18 | 90 | 29 | 40 | 1.65 | 0.9 | O |
| 40 | 0.2 | 18 | 90 | 50 | 10 | 0.33 | 5.0 | O |
| 41 | 0.2 | 18 | 90 | 50 | 20 | 0.75 | 1.4 | O |
| 42 | 0.2 | 18 | 90 | 65 | 30 | 1.20 | 0.9 | O |
| 43 | 0.2 | 18 | 90 | 100 | 10 | 0.5 | 5.0 | O |
| 44 | 0.2 | 18 | 90 | 100 | 20 | 1.2 | 0.7 | O |
| 45 | 0.2 | 18 | 90 | 110 | 20 | 0.85 | 1.7 | O |
| 46** | 0.2 | 18 | 90 | 115 | 20 | 0.91 | 0.9 | O |
| 47** | 0.2 | 18 | 90 | 150 | 15 | 0.75 | 2.5 | O |
| Comparative Example 3 | | | | | | | | |
| 48* | 0.2 | 18 | 90 | 5 | 10 | — | — | x |
| 49* | 0.2 | 18 | 90 | 5 | 20 | — | — | x |
| 50* | 0.2 | 18 | 90 | 5 | 30 | — | — | x |
| 51* | 0.2 | 18 | 90 | 10 | 8 | 0.14 | 25 | Δ |
| 52* | 0.2 | 18 | 90 | 10 | 50 | — | — | x |
| 53* | 0.2 | 18 | 90 | 100 | 8 | 0.30 | 14 | Δ |
| 54* | 0.2 | 18 | 90 | 100 | 30 | — | — | x |

TABLE 3-continued

| Run No. | MI of Polyethylene | MFI of Polystyrene | R Value | Ratio (Y) of Polystyrene (wt. parts)[1] | Foam Density (D)[2] | 25% Compressive Strength (kg/cm$^2$) | Creep (%) | Appearance Surface Uniformity and Closed Cell Ratio |
|---|---|---|---|---|---|---|---|---|
| 55* | 0.2 | 18 | 90 | 150 | 20 | — | — | x |
| 56* | 0.2 | 18 | 90 | 160 | 15 | — | — | x |

[1] Per 100 weight parts polyethylene
[2] kg/m$^3$
*Not an example of the present invention.
**Not an example of the present invention due to failure to satisfy the requirement that the 25% compressive strength be between 0.013D$^{1.15}$ and 0.024D$^{1.15}$.

EXAMPLE 4 AND COMPARATIVE EXAMPLE 4

The procedure of Example 3 and Comparative Example 3 was repeated, except that the resins used were replaced by polyethylene B and polystyrene D. The foams thus obtained were tested for physical properties. The results are shown in Table 4.

EXAMPLE 5 AND COMPARATIVE EXAMPLE 5

The procedure of Example 3 and Comparative Experiment 3 was repeated, except that the resin used was a blend of polyethylene A and polystyrene A. The forms thus obtained were tested for physical properties. The results are shown in Table 5.

TABLE 4

| Run No. | MI of Polyethylene | MFI of Polystyrene | R Value | Ratio (Y) of Polystyrene (wt. parts)[1] | Foam Density (D)[2] | 25% Compressive Strength (kg/cm$^2$) | Creep (%) | Appearance Surface Uniformity and Closed Cell Ratio |
|---|---|---|---|---|---|---|---|---|
| Example 4 | | | | | | | | |
| 56 | 0.26 | 7.5 | 28.8 | 10 | 10 | 0.18 | 8.0 | O |
| 57 | 0.26 | 7.5 | 28.8 | 10 | 15 | 0.29 | 6.0 | O |
| 58 | 0.26 | 7.5 | 28.8 | 10 | 20 | 0.41 | 3.4 | O |
| 59 | 0.26 | 7.5 | 28.8 | 10 | 25 | 0.54 | 2.8 | O |
| 60 | 0.26 | 7.5 | 28.8 | 20 | 15 | 0.33 | 4.5 | O |
| 61 | 0.26 | 7.5 | 28.8 | 20 | 20 | 0.48 | 2.5 | O |
| 62 | 0.26 | 7.5 | 28.8 | 30 | 20 | 0.66 | 2.2 | O |
| 63 | 0.26 | 7.5 | 28.8 | 40 | 20 | 0.68 | 2.3 | O |
| 64 | 0.26 | 7.5 | 28.8 | 80 | 15 | 0.47 | 3.2 | O |
| 65 | 0.26 | 7.5 | 28.8 | 120 | 10 | 0.5 | 4.8 | O |
| 66 | 0.26 | 7.5 | 28.8 | 130 | 10 | 0.54 | 4.9 | O |
| Comparative Example 4 | | | | | | | | |
| 67* | 0.26 | 7.5 | 28.8 | 5 | 10 | — | — | x |
| 68* | 0.26 | 7.5 | 28.8 | 5 | 20 | — | — | x |
| 69* | 0.26 | 7.5 | 28.8 | 10 | 8 | 0.12 | 24 | Δ |
| 70* | 0.26 | 7.5 | 28.8 | 10 | 30 | — | — | x |
| 71* | 0.26 | 7.5 | 28.8 | 50 | 20 | — | — | x |
| 72* | 0.26 | 7.5 | 28.8 | 100 | 8 | 0.29 | 15 | Δ |
| 73* | 0.26 | 7.5 | 28.8 | 100 | 15 | — | — | x |
| 74* | 0.26 | 7.5 | 28.8 | 150 | 10 | — | — | x |

*Not an example of the present invention.
[1] Per 100 wt. parts polyethylene
[2] kg/m$^3$

TABLE 5

| Run No. | MI of Polyethylene | MFI of Polystyrene | R Value | Ratio (Y) of Polystyrene (wt. parts)[1] | Foam Density (D)[2] | 25% Compressive Strength (kg/cm$^2$) | Creep (%) | Appearance Surface Uniformity and Closed Cell Ratio |
|---|---|---|---|---|---|---|---|---|
| Example 5 | | | | | | | | |
| 75 | 0.2 | 1.4 | 7 | 10 | 10 | 0.19 | 8.0 | O |
| 76 | 0.2 | 1.4 | 7 | 10 | 15 | 0.29 | 6.0 | O |
| 77 | 0.2 | 1.4 | 7 | 10 | 20 | 0.41 | 3.3 | O |
| 78 | 0.2 | 1.4 | 7 | 20 | 15 | 0.33 | 5.0 | O |
| 79 | 0.2 | 1.4 | 7 | 20 | 20 | 0.48 | 3.2 | O |
| 80 | 0.2 | 1.4 | 7 | 50 | 15 | 0.47 | 3.2 | O |
| 81 | 0.2 | 1.4 | 7 | 100 | 10 | 0.48 | 4.8 | O |
| Comparative Example 5 | | | | | | | | |
| 82* | 0.2 | 1.4 | 7 | 5 | 10 | — | — | x |
| 83* | 0.2 | 1.4 | 7 | 5 | 20 | — | — | x |
| 84* | 0.2 | 1.4 | 7 | 10 | 8 | 0.12 | 25 | Δ |
| 85* | 0.2 | 1.4 | 7 | 10 | 25 | — | — | x |
| 86* | 0.2 | 1.4 | 7 | 50 | 20 | — | — | x |
| 87* | 0.2 | 1.4 | 7 | 70 | 15 | — | — | x |
| 88* | 0.2 | 1.4 | 7 | 100 | 8 | 0.15 | 20 | |
| 89* | 0.2 | 1.4 | 7 | 120 | 15 | — | — | x |

*Not an example of the present invention.
[1] Per 100 wt. parts of polyethylene.
[2] d, (kg/m$^3$).

Figure 2:
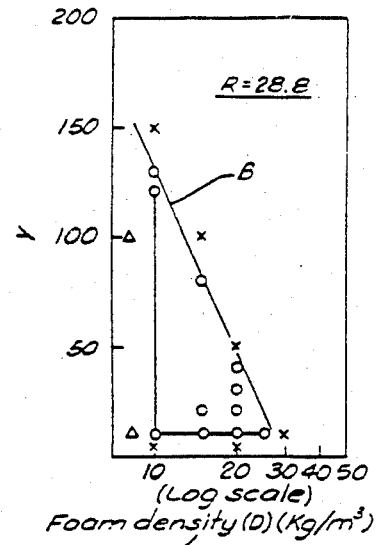
Figure 3:
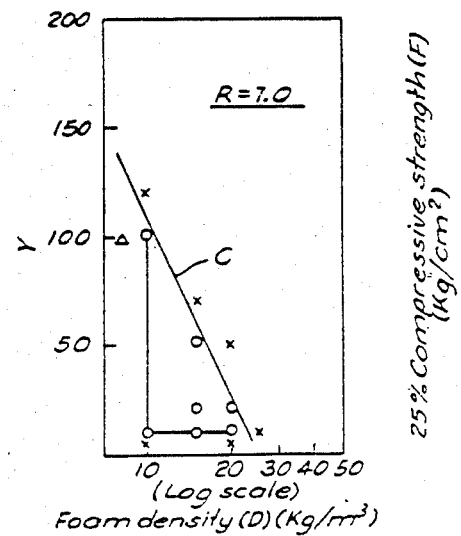

FIGS. 1, 2 and 3, which are based upon the data in Tables 3, 4 and 5, show the relationship between quantitative PS-PE ratio (Y) and foam density (D) in each flow rate ratio. In the figures, the marks O, Δ and × are identical with the ones in the tables.

According to this invention, the quantitative PS-PE ratio (Y) which is required for homogeneously mixed state in cell walls varies with the flow rate ratio (R) as shown in FIGS. 1, 2 and 3 wherein is 90, 28.8 or 7. It is noted from the figures that a rule exists in the relationship, which is expressed by the following formula:

$$10 \leq Y \leq 394.7 + 1.18R - 294.1 \log(D)$$

wherein D ranges from 10 to 40 kg/m³.

EXAMPLE 6 AND COMPARATIVE EXAMPLE 6

A total of 17 typical foams conforming to the present invention (Run Nos. 30, 31, 32, 33, 34, 37, 39, 40, 41, 42, 46, 47, 59, 60, 61, 62, and 80) and the comparative foams (Run Nos. 51 and 53) indicated in Examples 3-5 and Comparative Example 3 and three additional foams (Run Nos. 90, 91 and 92) which were produced as described below were tested for creep and decrease in repeating cushioning property according to the respective methods hereinbefore described. The results are shown in Table 6.

Run No. 90

A foam having 20 kg/m³ of density and about 1.2 mm of average cell size was obtained by repeating the procedure of Example 3, except that 100 parts by weight of polyethylene A and 20 parts by weight of polystyrene B were used and that trichloromonofluoromethane (F-11) was used as the blowing agent.

Run Nos. 91 and 92

Two foams each having an average cell size of about 1.2 mm in diameter, and having different densities (i.e., 20 kg/m³ for Run No. 91 and 34 kg/m³ for Run No. 92) were obtained by repeating the procedure of Example 3, except that 100 parts by weight of polyethylene E and 53.8 parts by weight of polystyrene E were used and that F-11 was used as the blowing agent.

These three foams were allowed to stand in the air at 40° C. for one day following their production to ensure full recovery from shrinkage, and thereafter subjected to the aforementioned creep and cushioning testing.

Figure 4:
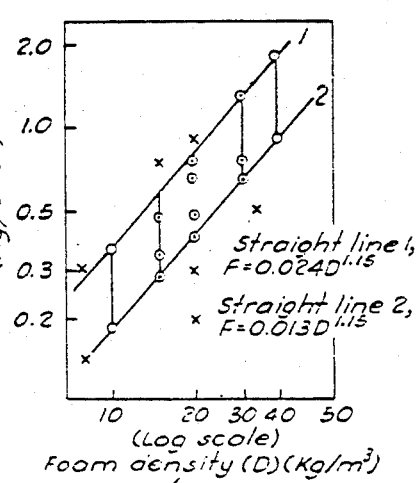
FIG. 4 is a graph showing the relationship between the 25% compressive strength (F) and the foam density (D). As can be seen, the logs of the upper and lower limits of the compressive strength, F, are linearly related to the log of the foam density, D.
Figure 5:
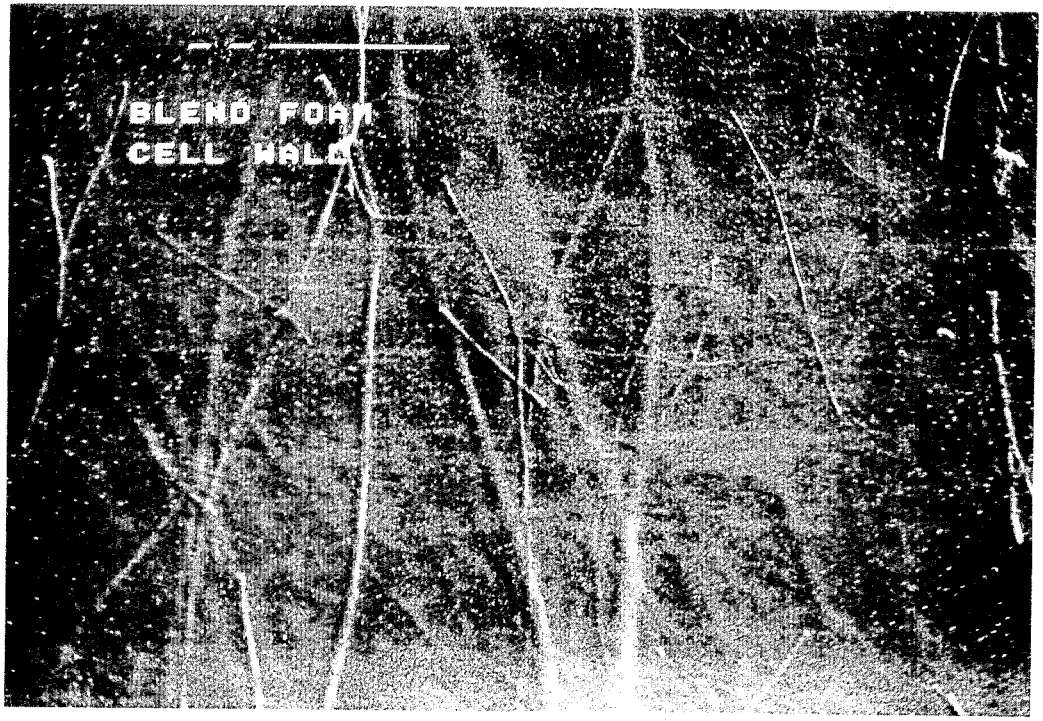
FIGS. 5-8 are electron photomicrographs of cell walls of certain polyethylene/polystyrene blend foams.
Figure 6:
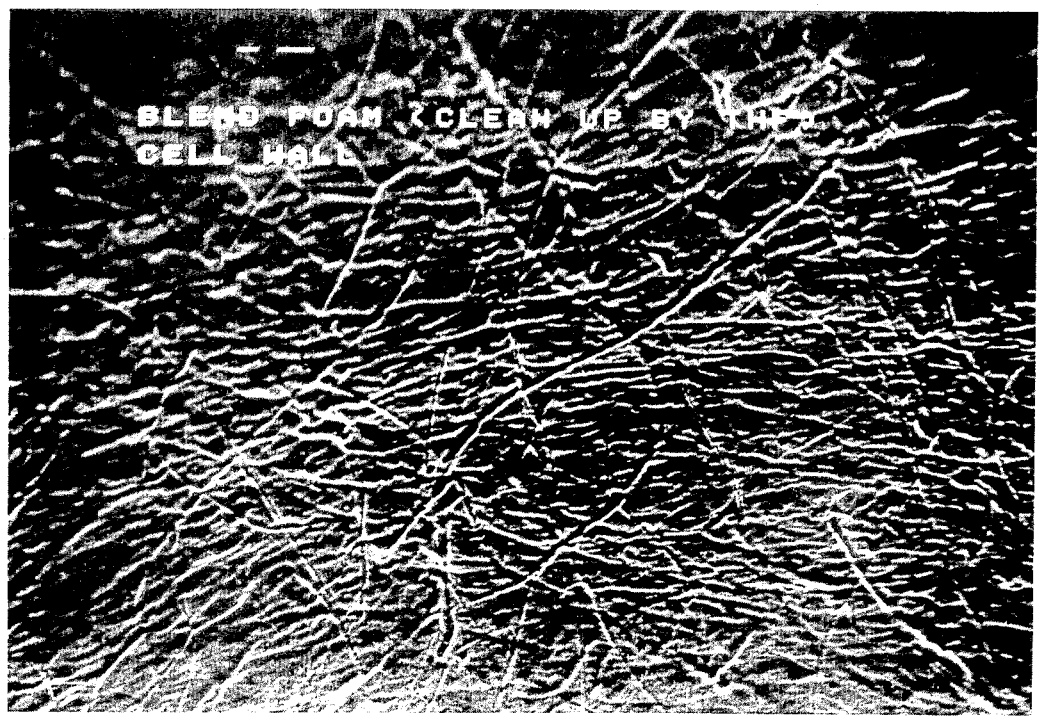
Figure 7:
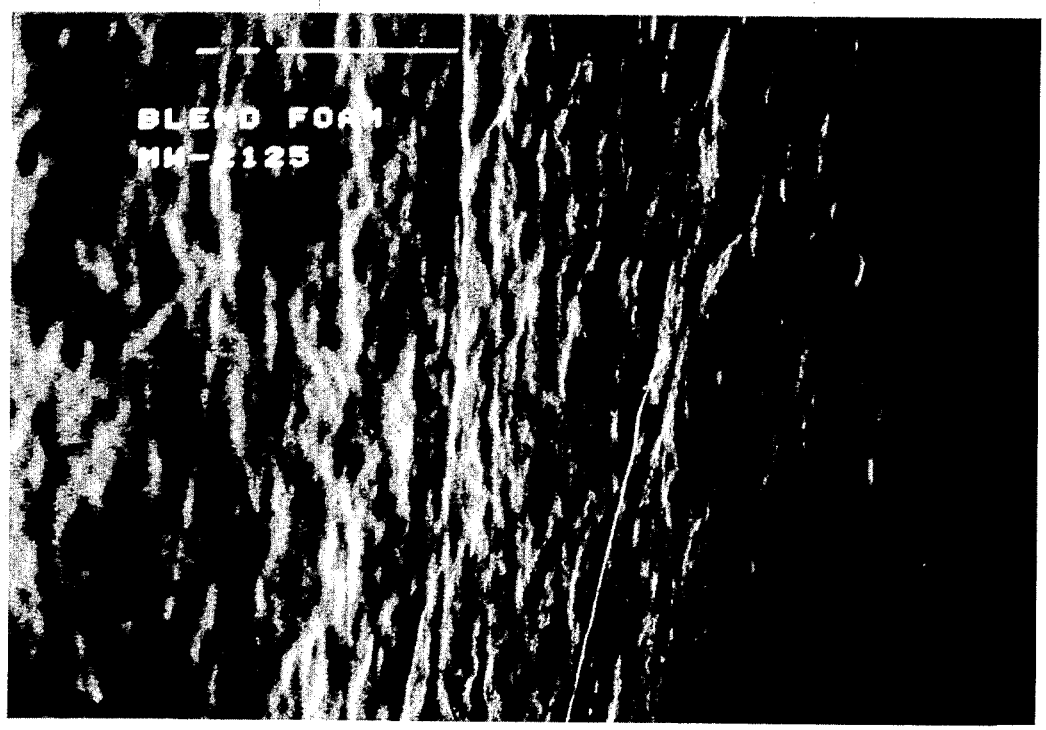
Figure 8:
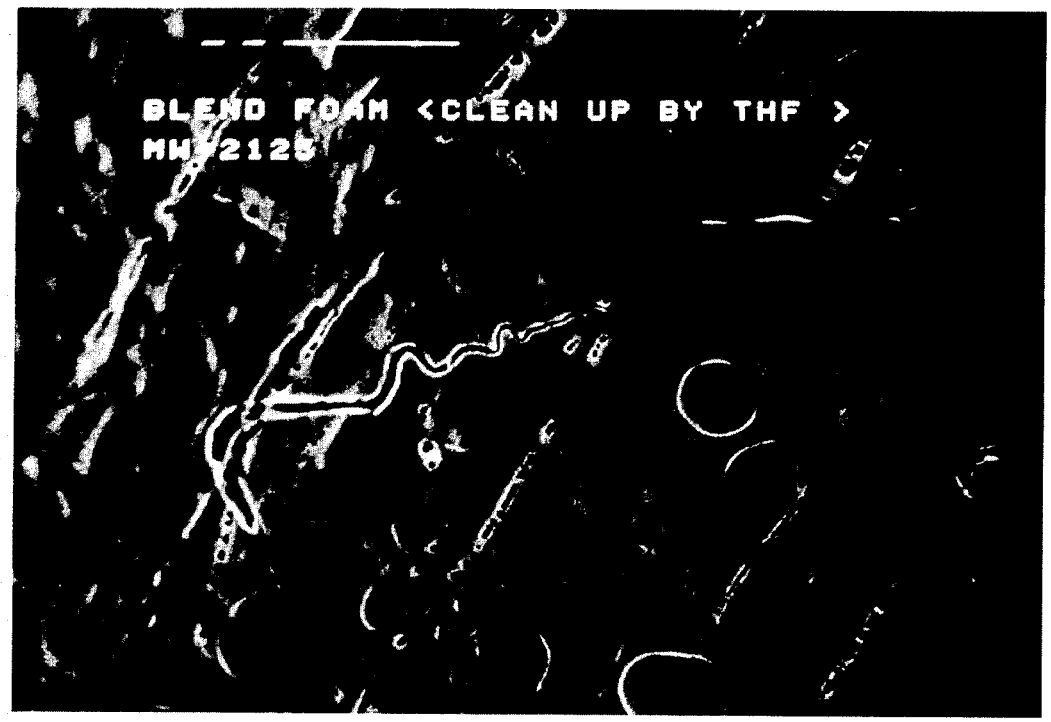

By plotting the results of the overall rating given in Table 6 in terms of the relation between the foam density (D) and the 25% compressive strength (F), there was obtained a graph shown in FIG. 4.

It is seen from FIG. 4 that even when the individual component resins have the proper melt index and melt flow rates and even when such individual components are blended in the proportion specified by this invention, the foam does not fulfil the objects of this invention unless the relation between (D) and (F), i.e., the structural index of the foam, falls within the following ranges $$0.024D^{1.15} \geq (F) \geq 0.013D^{1.15}$$

wherein, D is in the range of from 10 to 40 kg/m³.

TABLE 6

| Foam Sample Run Number | Foam Density (kg/m³) | 25% Compressive Strength (kg/cm²) | Creep (%) | Drop of Repeated Cushioning Property | Practical Performance (Overall Rating) |
|---|---|---|---|---|---|
| 51* | 8 | 0.14 | 25 | 80 | x |
| 53* | 8 | 0.30 | 14 | 82 | x |
| 30 | 10 | 0.19 | 8.0 | 45 | o |
| 40 | 10 | 0.33 | 5.0 | 47 | o |
| 31 | 15 | 0.29 | 6.0 | 21 | |
| 60 | 15 | 0.33 | 4.5 | 15 | |
| 80 | 15 | 0.47 | 3.2 | 16 | |
| 47** | 15 | 0.75 | 2.5 | 75 | x |
| 32 | 20 | 0.41 | 3.5 | 15 | |
| 61 | 20 | 0.48 | 2.5 | 18 | |
| 62 | 20 | 0.66 | 2.2 | 21 | |
| 41 | 20 | 0.75 | 2.0 | 30 | |
| 59 | 25 | 0.54 | 2.8 | 19 | |
| 33 | 30 | 0.65 | 2.2 | 21 | |
| 37 | 30 | 0.76 | 1.5 | 19 | |
| 42 | 30 | 1.20 | 0.9 | 40 | |
| 34 | 40 | 0.91 | 1.3 | 45 | o |
| 39 | 40 | 1.65 | 0.9 | 50 | o |
| 46** | 20 | 0.91 | 0.9 | 57 | x |
| 90** | 20 | 0.20 | 8.0 | 55 | x |
| 91** | 34 | 0.50 | 7.0 | 70 | x |
| 92** | 20 | 0.30 | 10.0 | 68 | x |

*Not an example of the present invention.
**Not an example of the present invention. The 25% compressive strength does not meet the requirements of being between $0.013D^{1.15}$ and $0.024D^{1.15}$.

COMPARATIVE EXAMPLE 7

A polymerization vessel containing 200 parts by weight of water was charged with 100 parts by weight of low-density polyethylene (0.26 of MI and 0.9215 of density), 100 parts by weight of styrene monomer, 0.9 part of weight of magnesium pyrophosphate, 0.04 part by weight of sodium dodecylbenzene sulfonate, and 1 part by weight of benzoyl peroxide. The air in the vessel was displaced by nitrogen gas. The mixture in the vessel was stirred at 80° C. for one hour, then heated to 90° C. and retained at this temperature for two hours, subsequently heated to 110° C. and retained at this temperature for four hours to polymerize the styrene impregnated into the polyethylene. The polymerization mixture was cooled, dehydrated, washed with water, and dried to afford resin particles (substantially spherical of about 2 mm in diameter) having polystyrene resin, blended in polyethylene resin. The resin blend particles consisted of 100 parts by weight of polyethylene resin and 100 parts by weight of polystyrene resin.

In a tumbler, 100 parts by weight of the resin blend obtained as described above, 100 parts by weight of low-density polyethylene (0.26 of MI and 0.9215 of density), 0.1 part by weight of polybutene, and 0.5 part by weight of talc were thoroughly mixed. The resultant mixture was fed to an extruder having an inside diameter of 65 mm. Into this mixture, 30 parts by weight (based on 100 parts by weight of the resin) of dichlorodifluoromethane blowing agent (F-12) was injected and admixed therewith in the extruder. The resultant blend was cooled to 115° C. by being sent through a cooling device. The cooled blend was extrusion foamed via a die orifice 8 mm in diameter into the atmosphere. Consequently, there was obtained a cylindrical foam which had a density of 20 kg/m³. This foam was tested for the properties by the respective methods described hereinbefore. The results are shown in Table 7 (Run No. 93).

COMPARATIVE EXAMPLE 8

The commercially available molded foams described below were tested for properties. The results are shown in Table 7.

for creep, drop of repeated cushioning property, compression recovery, solvent resistance, and dimensional stability to elevated temperatures. The results are shown in Table 7.

From Table 7, it is seen that the foams of the present

TABLE 7

| Foam | Material | Producer | Shape and Size | Application |
| --- | --- | --- | --- | --- |
| Foam obtained[3] by molding expandable beads | Polyethylene-polystyrene blend resin wherein the component proportion of polystyrene is 67 parts by weight per 100 parts by weight of polyethylene[2] | S Company[1] | 50 mm (thickness) × 500 mm × 500 mm board | Cushioning and heat insulation |
| Foam obtained by molding expandable beads | Polystyrene | K Company[4] | 50 mm (thickness) × 500 mm × 500 mm board | Cushioning |
| Polyethylene foam | Polyethylene | A Company[5] | 50 mm (thickness) × 500 mm × 500 mm board | Cushioning and heat insulation |

[1] S Company is Sekisui Plastics Co., Ltd.
[2] The polymer blend of this foam is of the type prepared by polymerizing styrene monomer impregnated in pre-formed polyethylene beads.
[3] The compressive strength of this foam sample was 1.4 kg/cm$^2$.
[4] This foam sample was obtained commercially. The manufacturer of such foam is unknown.
[5] A Company is Asahi-Dow, Limited.

COMPARATIVE EXAMPLE 9

Low-density polyethylene (0.26 of MI and 0.9215 of density) was extrusion foamed through an extruder having an inside diameter of 65 mm. In this case, 2 parts by weight of stearamide was used as an anti-shrinkage agent to preclude shrinkage of the foam produced and the blowing agent employed was dichlorodifluoromethane (F-12) in an amount of 30 parts by weight based on 100 parts by weight of polyethylene. Consequently, there was obtained a foam having 25 kg/m$^3$ of density and 1.5 mm of average cell size.

When the polyethylene resin alone was used, the foam could not be molded uniformly when the density was lower than 25 kg/m$^3$.

The foam obtained as described above was tested for properties by the respective methods hereinbefore described. The results are shown in Table 7.

The foams of this invention indicated in Example 3 (Run No. 42) and Example 4 (Run Nos. 61 and 62) and the foams of Comparative Example 6 (Run No. 90) and Comparative Example 7 (Run No. 93) were also tested invention excel in creep and repeated cushioning property and exhibit not less than 90% of compression recovery and not more than 10% of solvent resistance, the values favorably comparable with those obtainable by the foam produced solely of polyethylene resin. Besides, they exhibit not more than 5% of change of size by heat, the value excelling that obtainable by the foam produced solely of polyethylene resin.

In addition, the foams of this invention are superior to the foams produced of the conventional polyethylene-polystyrene resin blend in terms of compression recovery and solvent resistance.

Foams possessing all these outstanding properties have never been known to those skilled in the art. The cause of such beneficial combination of such properties is not fully understood and, accordingly, the present inventors do not intend to be limited to any particular theory of operation. However, it is believed that such beneficial combination of properties may result from the resin blend being distributed in the cell walls of the foam in a peculiar manner and structure entirely unlike those heretofore known to those skilled in the art.

TABLE 7

| Specimen | Ratio (Y) of Polystyrene (Wt. Parts[1]) | Foam Density (kg/m$^3$) | Creep (%) | Drop of Repeated Cushioning Property | Compression Recovery (%) | Solvent Resistance (vol. %) | Change of Size By Heat (%) |
| --- | --- | --- | --- | --- | --- | --- | --- |
| No. 61 | 20 | 20 | 2.5 | 18 | 98 | −7.0 | 5 |
| No. 62 | 30 | 20 | 2.2 | 21 | 98 | −7.5 | 3 |
| No. 93* | 25 | 20 | 2.7 | 58 | 80 | −30 | 4 |
| No. 90* | 20 | 20 | 8.0 | 55 | 80 | −30 | 7 |
| No. 42 | 65 | 30 | 0.9 | 40 | 93 | −8.0 | 1 |
| Product of S Company* Comparative Samples | ~67 | 32.5 | 0.8 | 79 | 70 | −32 | 1 |
| Comparative Example 9* | 0 | 25 | 8.0 | 11 | 95 | −11 | 24 |
| Product of A Company* | 0 | 41 | 2.0 | 38 | 95 | −9.5 | 14 |
| Product of K Company* | 100% polystyrene | 20 | 1.0 | 100 | 70 | Dissolved | <1 |

*Not an example of the present invention.
[1] Per 100 parts by weight of polyethylene.

Figure 9:
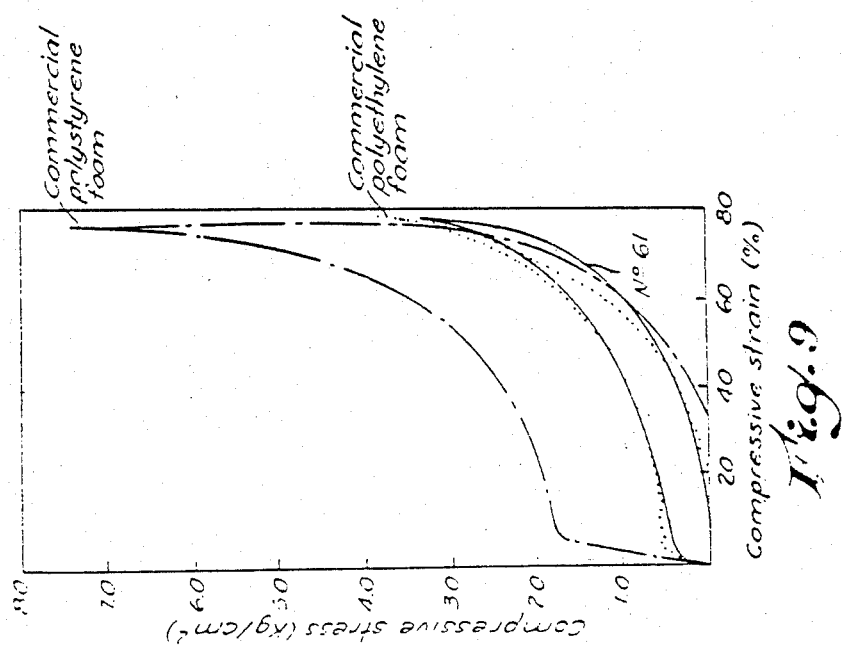
FIG. 9 is a graph showing the relationship between the compressive stress and compressive strain for a commercial polystyrene foam, a commercial polyethylene foam and for a polyethylene/polystyrene blend foam of the present invention.

FIG. 9 shows the relationship between compressive stress and compressive strain with regard to the foam of Run No. 61, and commercial polystyrene foam and polyethylene foam of which expansion ratio was almost the same as that of Run No. 61 foam of this invention. It is seen from FIG. 9 that the foam of the present invention is softer than the foam of polystyrene and has better in compression recovery than the polystyrene foam. In addition, FIG. 9 also shows that the foam of this invention shows greater flexibility than the foam of polyethylene so long as the compressive stress is in a low range and deforms with growing compressive stress like the polyethylene foam but exhibits higher compression recovery than the foam of polyethylene.

What is claimed is:

1. A substantially closed-cell polymer blend foam characterized by a density, D, of from 10 to 40 kg/m$^3$, a 25 percent compressive strength, F, in kg/cm$^2$ satisfying the formula $$0.024D^{1.15} \geq F \geq 0.013D^{1.15},$$

a compression recovery of 90 percent or greater, and a toluene solvent resistance in terms of volumetric change of 10 percent or smaller, prepared by extrusion foaming a homogeneous blend consisting of low density polyethylene having a density of from 0.915 to 0.930 g/cm$^3$ and a melt index of 0.2–2.6 g/10 minutes; polystyrene having a melt flow rate of 1.4–18 g/10 minutes; one or more volatile organic blowing agents; and optionally light stabilizers, colorants, lubricants and nucleating agents, said blend meeting the requirements $$7 \leq R \leq 90$$

$$10 \leq Y \leq 394.7 + 1.18R - 294.1 \log(D)$$

wherein R is a ratio of the melt flow rate of the polystyrene resin divided by the melt index of the polyethylene resin, Y is the content of the polystyrene resin in parts by weight per 100 parts by weight of the polyethylene resin, and D is as defined above.

2. The polymer blend foam of claim 1 having a closed-cell content of 90 volume percent or more.

3. The polymer blend foam of claim 1 which has been prepared using a voltage organic blowing agent having a kauri-Butanol value of from 15 to 22 as determined by ASTM D-1133.

4. The polymer blend foam of claim 1 having a decrease in repeated cushioning property of 40% or less as determined in accordance with JIS Z0235 by impacting a 50 mm thick foam specimen with a series of 5 drops from a height of 60 cm, developing a maximum acceleration-static stress curve for each of such 5 successive drops, determining the maximum acceleration value at optimum stress for each drop and by calculating the percentage decrease in repeated cushioning property according to the following formula:

$$\text{Decrease ratio} = \frac{\text{Maximum Acceleration of Average 2-5 Drops} - \text{Maximum Acceleration of First Drop}}{\text{Maximum Acceleration of First Drop}} \times 100$$

5. The polymer blend foam of claim 1 which exhibits a creep value of 6 percent or less as determined in accordance with JIS K 6767 under conditions of 0.1 kg/m$^2$ load over a 24 hour period.

* * * * *